United States Patent [19]
Piening et al.

[11] Patent Number: 5,922,446
[45] Date of Patent: Jul. 13, 1999

[54] STRUCTURAL MEMBERS WITH LARGE UNIDIRECTIONAL RIGIDITIES

[75] Inventors: Matthias Piening; Arno Pabsch, both of Braunschweig; Christof Sigle, Braunscheig, all of Germany

[73] Assignee: Deutsches Zentrum fur Luft- und Raumfahrt e.V., Germany

[21] Appl. No.: 09/116,092

[22] Filed: Jul. 15, 1998

[30] Foreign Application Priority Data

Jul. 16, 1997 [DE] Germany ............... 197 30 381

[51] Int. Cl.$^6$ .............. B64C 3/18; B64C 11/20; F01D 5/14
[52] U.S. Cl. .......... 428/292.1; 244/124; 244/123
[58] Field of Search ............ 428/292.1; 244/124, 244/123

[56] References Cited

U.S. PATENT DOCUMENTS 5,496,002   3/1996   Schutze .
5,735,486   4/1998   Piening et al. .

FOREIGN PATENT DOCUMENTS 195 29 706
A1   2/1997   Germany .

Primary Examiner—Marion McCamish
Assistant Examiner—Ula C. Ruddock
Attorney, Agent, or Firm—Salter & Michaelson

[57] ABSTRACT

In a structural member with large unidirectional rigidities unidirectional fiber bundles are completely embedded in shear resistant sheaths. The shear resistant sheaths are joined to a shear resistant torsion shell made up of skin layers by shear resistant vertical walls. A part of the vertical walls is shaped into stringers. Dividing layers (20) interrupting the passage of tension between adjacent unidirectional fiber bundles (30) are provided between the shear resistant sheaths (31) of the unidirectional fiber bundles (30).

13 Claims, 1 Drawing Sheet

STRUCTURAL MEMBERS WITH LARGE UNIDIRECTIONAL RIGIDITIES

TECHNICAL FIELD

The invention relates to structural members with large unidirectional rigidities, wherein unidirectional fibre bundles are completely embedded in shear resistant sheaths, the shear resistant sheaths are joined to a shear resistant torsion shell made up of skin layers by shear resistant vertical walls, formed particularly by folding the uppermost skin layer of the torsion shell, and part of the vertical walls are shaped into stringers.

BACKGROUND OF RELATED ART

Structural members with large unidirectional rigidities are known (see DE 195 29 476 A1, EP 0 758 607 A2). For example, EP 0 758 607 A2 discloses a wing with shear resistant wing shells made of fibre composites for aircraft. In the wing with shear resistant wing shells made of fibre composites, particularly fibre-reinforced plastics, members taking up tensile and compressive forces are mounted inside the wing shells and have unidirectional fibres extending longitudinally of the wing. Spaced stringers are formed inside the wing shells, longitudinally of the wing, their fibre component being formed by a fibre skin joined to the fibre skin of the wing shell. Unidirectional fibre bundles, embedded with thrust, resistance in the synthetic resin matrix of the wing shells, are arranged between the spaced stringers. They extend longitudinally of the wing and have a substantially rectangular cross-section. The space between two stringers to receive a plurality of fibre bundles is divided widthwise by intermediate walls extending parallel with the stringers. The fibre component of the stringers and/or intermediate walls is formed by folding at least the inner fibre layer of the torsion skin of the flight shell. The dividing walls may be provided with skin sections lying on top of the fibre bundles.

Fibre-reinforced structures are normally made up of multi-directional laminates. The dimensioning and also the fibre orientation in the individual laminate layers follow elongation criteria, such that a predetermined elongation value must not be exceeded anywhere within the structure. The limit for elongation of fibre-reinforced structures which has found acceptance for aircraft structural members, according to the application, is an elongation of up to $\epsilon=0.4\%$ with the maximum limit load and up to $\epsilon=0.6\%$ with the ultimate load.

This limit to elongation in the structural members is based on the assumption that the skin covering the load-bearing fibres, generally a plastic matrix, will not crack or suffer other damage from operational causes, which might lead to failure of the structural member, up to those values. So here the function of the plastic matrix is not only to keep the structural member in shape and support the individual fibres, which would not be able to bear loads without that support, particularly under compressive stress. The matrix is also the only load-transferring member in the structure for stresses acting across the laminate planes.

Unidirectional cross-sections of large area, e.g. fibre bundles, undergo large transverse elongation when loaded, causing transverse tensile and transverse compressive stresses in the shell e.g. of a plane load-bearing structure. Such stresses occur wherever transverse elongations of any kind are impeded. In a component with large unidirectional rigidities this leads to constructional limitations and overdimensioning of rigidities which are not oriented in the direction of the main load.

There is therefore needed in the art structural members of the generic type with large unidirectional rigidities, in which transverse tensile stresses are reduced by the provision of constructional measures.

SUMMARY

In accordance with the present invention, there is provided a structural member having large unidirectional rigidities including unidirectional fibre bundles that are completely embedded in shear resistant sheaths. Dividing layers are provided between the shear resistant sheaths of the unidirectional fibre bundles to interupt the passage of tension between adjacent unidirectional fibre bundles.

A structural member with large unidirectional rigidities is thereby provided, where the constructionally lessened transverse tensile stresses are taken up by unidirectional rigidities in the direction of the transverse tensile stress component. Thus a partitioning of the loaded cross-sections is obtained, in such a way that specific stresses can have corresponding rigidities assigned to them.

The invention is in fact based particularly on the realisation that the above-mentioned elongation limit, which in the case of quasi-isotropic structural members is certainly a suitable means of ensuring safe dimensioning of the structural member, is not permissible for structural members of emphatically anisotropic form. Whereas with quasi-isotropic multi-directional laminates there are adequate rigidities in every direction to take up even stress components caused by transverse contraction effects, this is not possible with unidirectionally emphasised rigidities. It is found to be especially difficult with unidirectional cross-sections of large area such as plane load-bearing structures of aircraft.

The shear resistant sheaths are joined to a shear resistant torsion shell made up of skin layers by shear resistant vertical walls, and part of the vertical walls are shaped into stringers. In one embodiment, the vertical wall is most preferably formed by folding the skin layer or layers arranged under the unidirectional fibre bundles into ascending and descending skin layers, and inserting a dividing layer between the two skin layers. The dividing layer ensures that the flow of at least tensile stresses between adjacent unidirectional fibre bundles is interrupted. While compressive stresses continue to be transferred through contact between the folded vertical walls, tensile stresses are not transferred between adjacent unidirectional fibre bundles. Instead they are completely transferred by particularly preferred unidirectional rigidities acting across the vertical wall, lying across the length of the unidirectional fibre bundles and provided above and below the unidirectional fibre bundles. The advantageous inclusion of dividing layers within the folds is easy to carry out in the production process.

The provision of dividing layers proves to be particularly advantageous with a view to its use in the supporting wings of large aircraft, where the dimensions transversely to the direction of the load may be greater than 10 m. Transverse tensile stresses of considerable magnitude may build up in unidirectional fibre bundles in such wings. These may cause the unidirectional fibre bundles to be torn open. Such tearing open is avoided by the provision of the dividing layers according to the invention, as the transverse tensile stresses are taken up by appropriately oriented fibre skins, namely the unidirectional rigidities, particularly uinidirectional skin layers, provided above and below the unidirectional fibre bundles and across their length.

In order to avoid internal stresses caused by heat, which result in elongation and which occur in service and owing to the constant temperature differences in the production process, it is particularly preferable to provide a uniform thickness or equal number of shear resistant skin layers of the torsion shell in the structural members, arranged above and below the unidirectional fibre bundles or the unidirectional skin layers acting across their length. The number of shear resistant skin layers is most preferably chosen dependent on the influence of the stringers in the torsion shell. Symmetry is thus obtained in respect of the shear resistant skin layers.

It is particularly preferable for the upper or uppermost and the lower or lowermost unidirectional skin layer acting across the length of the unidirectional fibre bundles to be continuous. Alternatively the upper or uppermost unidirectional skin layer may be interrupted in the region of the stringers, while the lower or lowermost unidirectional skin layer is continuous.

It is particularly preferable for the unidirectional fibre bundles to have a substantially rectangular cross-section. The dividing layers are preferably made of a material which cannot be wetted by resin.

BRIEF DESCRIPTION OF THE DRAWINGS

For further explanation of the invention embodiments of structural members will now be described with reference to the accompanying drawings, in which.

DETAILED DESCRIPTION OF THE ILLUSTRATIVE EMBODIMENTS

Figure 1:
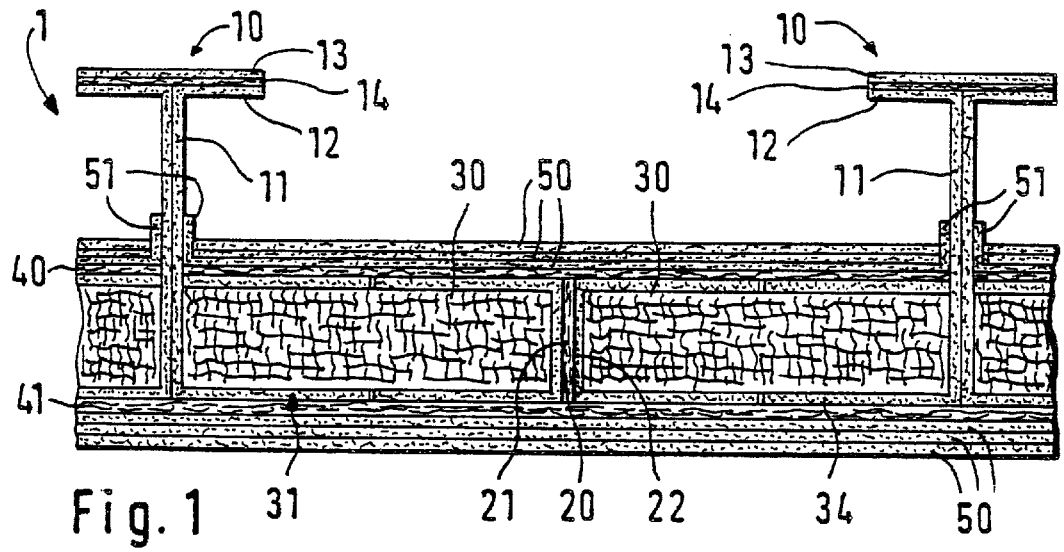
FIG. 1 is a lateral sectional view of a first embodiment of a structural member according to the invention with two stringers.

FIG. 1 shows a lateral sectional view of a structural member 1 with two stringers 10. The two stringers 10 enclose two unidirectional fibre bundles 30 of rectangular cross-section. The two bundles 30 are separated from each other by a dividing layer 20. The layer 20 is preferably in the line of symmetry between the two stringers 10.

The unidirectional fibre bundles 30 are surrounded by shear resistant sheaths 31. The sheaths are preferably ±45° fibre skins. The fibre bundles 30 are thus held together. At the same time they are given shear resistance by virtue of the sheathing 31. The respective ends of the sheaths 31 are in the region adjacent the stringers and spaced therefrom. The sheathing is closed just by abutting ends as a result of the further covering provided by the additional skin layers. A further shear resistant layer is drawn out of the shell of the structural member in the region of the stringers. It will be described here as layer member 34. Layer member 34 forms a vertical limb 11 of a fold which forms the stringer 10 in respect of its longitudinal extent.

In the upper part of the stringer 10 the vertical limb 11 is angled and forms an angled lower skin layer 12. The two layers 12 of the two vertical limbs 11 of the stringer 10, directed away from each other, are covered by two layers, namely a central skin layer 14 and an upper skin layer 13 above it. A unidirectional flange reinforcement longitudinally of the stringer of T section may be provided by the central skin layer 14.

A unidirectional rigidity, preferably in the form of a unidirectional upper skin layer 40 is provided between the two vertical limbs 11 of the two stringers 10. The unidirectional upper skin layer preferably lies on the shear resistant sheaths 31 of the two unidirectional fibre bundles 30 and has a fibre orientation across the length of the bundles 30. If a fibre orientation of 0° is provided for the bundles 30, there will therefore be a fibre orientation of 90° for the skin layer 40.

A lower unidirectional skin layer 41 is provided, extending continuously at the underside of the shear resistant sheaths 31 of the unidirectional fibre bundles 30. It has the same fibre orientation as the upper unidirectional skin layer 40.

Transverse tensile stresses acting on the structural member are taken up by the unidirectional skin layers 40, 41. Transverse tensile stresses in the unidirectional fibre bundles are thereby largely isolated from the stress components acting outside the fibre bundles.

Shear stresses acting on the structural member are taken up by shear resistant skin layers 50 provided above the unidirectional skin layers 40, 41. The shear resistant skin layers 50 remain stiff when a shear force is acting against it. In the FIG. 1 embodiment three of these layers 50 are arranged on the underside of the skin layer 41. The number of skin layers 50 is advantageously chosen according to the influence of the stringers. To obtain freedom from internal stresses caused by heat in the structural member, the shear resistant skin layers 50 chosen for the underside of the skin layer 41 and the top of the skin layer 40 are of uniform thickness or equal in number. In FIG. 1 therefore there are similarly three skin layers 50 on top of the skin layers 40.

The shear resistant skin layer 50 lying directly on the upper unidirectional skin layer 40 has angled edge strips 51 in the region of the stringers 10. These are placed against the outside of the vertical limbs 11 of the stringers 10. They therefore form a reinforcement for the stringers 10 in that region.

The two shear resistant skin layers 50 arranged above them are fitted between the angled edge strips 51.

As a means of isolating the two adjacent unidirectional fibre bundles 30 from each other, i.e. of avoiding the transfer of transverse tensile stresses which might cause the fibre bundles to be torn open, the dividing layer 20 is arranged between these two bundles. The layer 20 is located between an ascending skin layer 21 and a descending one 22. The two skin layers 21 and 22 are part of a folding of layers of the torsion shell provided under the unidirectional fibre bundles 30, particularly the shear resistant skin layers 50. The dividing layer 20 is preferably made of a material which cannot be wetted by resin.

The shear resistant sheaths 31 of the unidirectional fibre bundles 30 are thus joined to the shear resistant skin layers 50 of the torsion shell by the shear resistant vertical walls, in the form of the vertical limbs 11 of the stringers 10 and the ascending and descending skin layers 21, 22 in combination with the dividing layer 20. The vertical walls may be joined to the shear resistant skin layers 50 of the torsion shell below them by stitching.

The function of the stringers 10 is to support bulges in the torsion shell. The function of the vertical walls, formed by ascending and descending skin layers 21, 22 with the dividing layer 20 between them, is both to isolate the unidirectional fibre bundles 30 from each other and also to increase the damage tolerance of the structural member of anisotropic material and to prevent damage from extending beyond the limits which it forms.

A second embodiment of a structural member 1 according to the invention is shown in a lateral sectional view in FIG.

2. In contrast with the structural member in FIG. 1 an upper unidirectional skin layer 42, formed symmetrically with the lower unidirectional skin layer 41, extends right through in FIG. 2. The vertical limbs 11 of the stringers 10 are accordingly formed by an angled skin layer 52 of the shear resistant skin layer 50 formed and arranged above the unidirectional upper skin layer 42. The shear resistant skin layer 50 arranged above it, with an angled edge strip 51, is formed appropriately as explained in FIG. 1.

Figure 2:
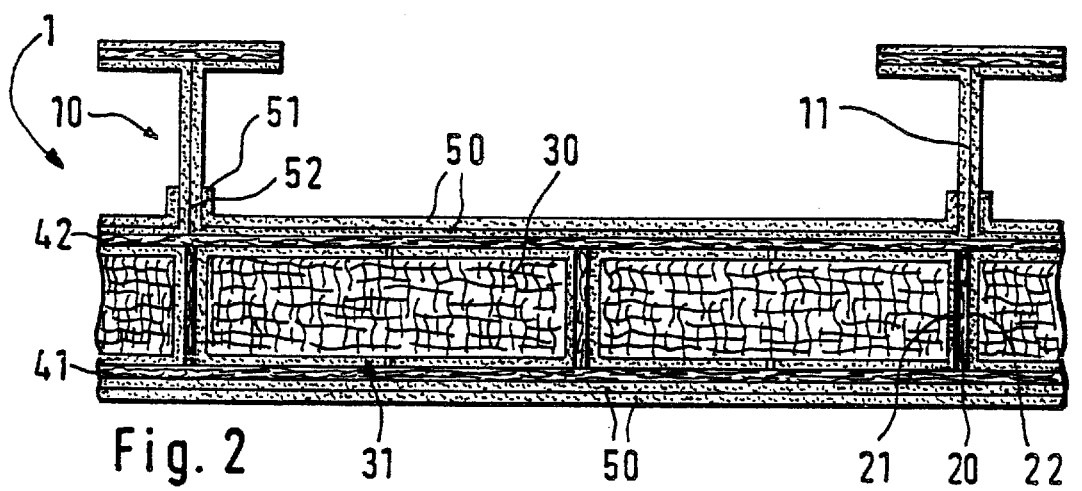
FIG. 2 is a lateral sectional view of a second embodiment of a structural member according to the invention with an upper unidirectional skin layer extending right through, and FIG. 3 is a graph plotting the elongation over the transverse extent of the structural member.

In FIG. 2 only two layers of shear resistant skin 50 are provided on top of the unidirectional skin layer 42 and on the underside of the unidirectional lower skin layer 41.

In order to isolate the unidirectional fibre bundles 30 in the region of the stringers 10, between the upper unidirectional skin layer 42 and the lower unidirectional skin layer 41, also extending right through, ascending and descending skin layers are here again formed, with a dividing layer 20 inserted between them. As already explained in FIG. 1, the ascending and descending skin layers 21 and 22 similarly comprise shear resistant fibre layers. The dividing layer 20 arranged between them is preferably likewise made of a material which cannot be wetted by resin.

Alternatively to the embodiments explained in FIG. 1 and FIG. 2 a combination of the two embodiments may be provided. For example the upper unidirectional skin layer might extend right through at one respective stringer, as shown in FIG. 2, but not at another, as shown in FIG. 1. In this respect the arrangement may be appropriately adapted to the individual case.

Figure 3:
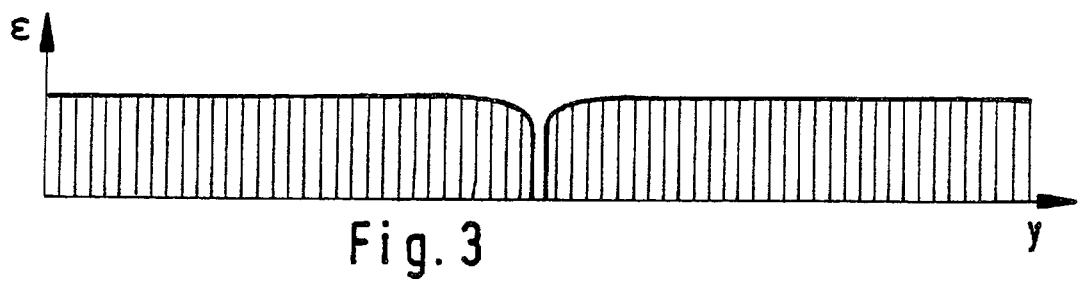

FIG. 3 is a graph plotting the elongated states caused by transverse tension within the unidirectional fibre bundles in one of the structural members shown in FIG. 1 or FIG. 2. There is a constant elongation c in the region of the unidirectional fibre bundles 30. The elongation ε becomes zero in the region of the dividing layers 20, in the sheath of the ascending and descending skin layers 21 and 22. Elongations are thus not transferred in that region. The required isolation of individual unidirectional fibre bundles 30 from each other is thereby achieved.

It will be understood that various modifications may be made to the embodiments disclosed herein. Therefore, the above description should not be construed as limiting, but merely as exemplifications of a preferred embodiment. Those skilled in the art will envision other modifications within the scope and spirit of the invention.

We claim:

1. A structural member with large unidirectional rigidities including at least two unidirectional fibre bundles, each fibre bundle being completely embedded in a corresponding shear resistant sheath, the shear resistant sheaths being joined to a shear resistant torsion shell made up of skin layers by shear resistant vertical walls, part of the vertical walls being shaped into stringers, the structural member comprising:

a dividing layer provided between the shear resistant sheaths enclosing the at least two unidirectional fibre bundles, the dividing layer interrupting the passage of tension between adjacent unidirectional fibre bundles.

2. The structural member according to claim 1, wherein the vertical walls include at least an ascending skin layer and a descending skin layer, wherein the dividing layer is positioned between the ascending and descending skin layers.

3. The structural member according to claim 1, further comprising unidirectional rigidities provided above and below the unidirectional fibre bundles, the unidirectional rigidities acting across the vertical walls and having a fibre orientation across the length of the unidirectional fibre bundles.

4. The structural member according to claim 3, wherein the torsion shell includes at least one shear resistant skin layer disposed above and below the unidirectional rigidities, wherein the shear resistant skin layer prevents internal stresses in the structural member caused by heat.

5. The structural member according to claim 3, wherein the unidirectional rigidities comprise a unidirectional upper skin layer and a unidirectional lower skin layer.

6. A structural member according to claim 5, wherein the upper and lower unidirectional skin layer acting across the length of the unidirectional fibre bundles are continuous.

7. A structural member according to claim 5, wherein the upper unidirectional skin layer is interrupted in the region of the stringers and the lower unidirectional skin layer is continuous.

8. The structural member according to claim 1, wherein the torsion shell includes at least one shear resistant skin layers disposed above and below the shear resistant sheaths, wherein the shear resistant skin layer prevents internal stresses in the structural member caused by heat.

9. The structural member according to claim 8, wherein the number of shear resistant skin layers is dependent on the influence of the stringers.

10. The structural member according to claim 9, wherein an equal number of shear resistant skin layers are disposed above and below the shear resistant sheaths.

11. The structural member according to claim 10, wherein the equal number of shear resistant sheaths are of uniform thickness.

12. A structural member according to claim 1, wherein the unidirectional fibre bundles have a substantially rectangular cross-section.

13. A structural member according to 1, wherein the dividing layer is made of a material which cannot be wetted by resin.

* * * * *